US006808842B2

(12) United States Patent
Siddiqui et al.

(10) Patent No.: US 6,808,842 B2
(45) Date of Patent: Oct. 26, 2004

(54) BATTERY PACK

(75) Inventors: Kabir Siddiqui, Sammamish, WA (US); Jeremy Jacobson, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 187 days.

(21) Appl. No.: 10/071,336

(22) Filed: Feb. 8, 2002

(65) Prior Publication Data

US 2003/0152825 A1 Aug. 14, 2003

(51) Int. Cl.[7] .................................. H01M 2/10
(52) U.S. Cl. ........................... 429/96; 429/97; 429/162
(58) Field of Search .................. 429/96–100, 123, 429/162

(56) References Cited

U.S. PATENT DOCUMENTS

| | | | | |
|---|---|---|---|---|
| 5,298,347 A | * | 3/1994 | Aksoy et al. | 429/98 |
| 5,552,240 A | * | 9/1996 | Derstine | 429/96 |
| 5,786,106 A | * | 7/1998 | Armani | 429/98 |
| 6,120,930 A | * | 9/2000 | Rouillard et al. | 429/162 X |
| 6,326,543 B1 | * | 12/2001 | Lamp et al. | 429/99 X |
| 2003/0022060 A1 | * | 1/2003 | Solomon et al. | 429/123 |

FOREIGN PATENT DOCUMENTS

DE 3904717 * 8/1989 ............ H01M/2/10
JP 7-025188 * 1/1995 ............ H01M/2/10

* cited by examiner

*Primary Examiner*—Stephen J. Kalafut
(74) *Attorney, Agent, or Firm*—Merchant & Gould

(57) ABSTRACT

An improved battery pack is provided for powering a hand-held portable electronic device such as a wireless telephone, hand-held personal computer, or personal digital assistant. The battery pack includes a generally rectangular battery cell where the battery cell has an upper surface and a lower surface, a length, a width and a thickness suitable for insertion into a hand-held portable device. The battery pack includes a battery cell casing for enclosing an outer perimeter of the battery cell, and the casing has a width equal to the thickness of the battery cell. A first locking latch of a pair of locking latches is defined along a first side of the battery cell casing and a second locking latch of the pair of locking latches is defined along a second side of the battery cell opposite the first locking latch. A locking latch catch is defined along an outer edge of each of the first and second locking latches for engaging latching detents defined within the interior casing of the hand-held electronic device for securing the battery pack within the electronic device. The locking latches are deformable so that the locking latches may deform inward toward the outer surface of the casing between the connection points of the locking latches to the casing so that an outer surface of the locking latches and the locking latch catches may pass by an inner surface of the latching detents.

24 Claims, 4 Drawing Sheets

BATTERY PACK

FIELD OF THE INVENTION

This invention relates in general to a battery pack for providing power to electronic devices such as hand-held computers, wireless telephones, personal digital assistants, and the like.

BACKGROUND OF THE INVENTION

In recent years, growing numbers of personal electronic devices, such as wireless telephones, personal digital assistants, hand-held personal computers, pagers, and the like are used extensively for business, education, and leisure. A well-known limitation affecting the use of such personal electronic devices is the amount of battery capacity available to the electronic device, and the fragility of the physical connection of battery packs to the electronic devices to which they are attached.

Most hand-held electronic devices, such as wireless telephones and personal digital assistants, either have an externally mounted battery pack, or a battery compartment in which a small battery is inserted. For electronic devices, such as wireless telephones, that require significant power during use, larger battery packs are most often required. Typically, relatively large battery packs are connected to the back side of wireless telephone casing. The battery pack is typically manufactured so that when the battery pack is connected to the back side of the wireless telephone, the battery pack itself becomes an integral portion of the casing of the wireless telephone. However, in most cases, a latch mechanism for removing the battery pack from the back side of the casing is present such that disengaging the latch mechanism allows the battery pack to be removed. A problem with such battery pack designs is that the battery pack often becomes disconnected from the electronic device if the electronic device is dropped or if the external latching mechanism is inadvertently disengaged. For example, if the electronic device is placed in the pocket of the user, the battery-latching mechanism is often disengaged when the latching mechanism comes into contact with other objects, such as automobile keys, causing the battery pack to separate from the electronic device. Moreover, with such external battery pack designs, often the latching mechanism becomes worn from extended use that allows the battery contacts between the battery pack and the contacts of the electronic device to lose electrical connectivity if the electronic device is vibrated or dropped.

It is with respect to these and other considerations that the present invention has been made.

SUMMARY OF THE INVENTION

In accordance with the present invention, the above and other problems are solved by an improved battery pack. The battery pack of the present invention is used for powering a hand-held portable electronic device such as a wireless telephone, hand-held personal computer, or personal digital assistant. The battery pack includes a generally rectangular battery cell where the battery cell has an upper surface and a lower surface, a length, a width and a thickness suitable for insertion into a hand-held portable device. The battery pack includes a battery cell casing for enclosing an outer perimeter of the battery cell, and the casing has a thickness equal to the thickness of the battery cell. A pair of locking latches for latching the battery pack to the hand-held portable electronic device are included and the first locking latch of the pair of locking latches is defined along a first side of the battery cell and a second locking latch of the pair of locking latches is defined along a second side of the battery cell opposite the first locking latch. A locking latch catch is defined along an outer edge of each of the first and second locking latches for engaging latching detents defined within the interior casing of the hand-held electronic device for securing the battery pack within the electronic device.

The first and second locking latches comprise an elongate member having a first end and a second end. The first end is attached to a portion of the battery cell casing and the second end is attached to the battery cell casing and spaced-apart relation to the first end such that a clearance is formed between an inner surface of the locking latch member and an outer surface of the battery cell casing between the connection points of the first and second ends of the locking latch member. The locking latches are deformable so that the locking latches may deform inward toward the outer surface of the casing between the connection points of the locking latches to the casing so that an outer surface of the locking latches and the locking latch catches may pass by an inner surface of the latching detents.

The battery pack includes an electrical battery contact disposed along an outer perimeter of the battery cell for electrical contact with a mating contact defined within the interior of the electronic device.

According to one aspect of the invention, the battery pack has a length of about 90 millimeters. The width of the battery pack is about 40 millimeters, and the thickness of the battery pack is about 4.5 millimeters. The battery cell casing is preferably comprised of a polycarbonate material.

The battery cell may be a variety of acceptable battery cells for providing electrical power to the electronic device, including lithium ion cells and lithium polymer cells.

These and other features and advantages, which characterize the present invention, will be apparent from a reading of the following detailed description and a review of the associated drawings. It is to be understood that both the foregoing general description and following detailed description are exemplary and explanatory only and are not restrictive of the invention as claimed.

DETAILED DESCRIPTION OF THE PREFERRED EMBODIMENT

The following description of an embodiment of the present invention is made with reference to the above-described drawings wherein like numerals refer to like parts or components throughout the several figures. The present invention is directed to an improved battery pack for powering an electronic device, such as a wireless telephone, personal digital assistant, hand-held personal computer, pager, and the like (hereinafter "electronic device").

Figure 1:
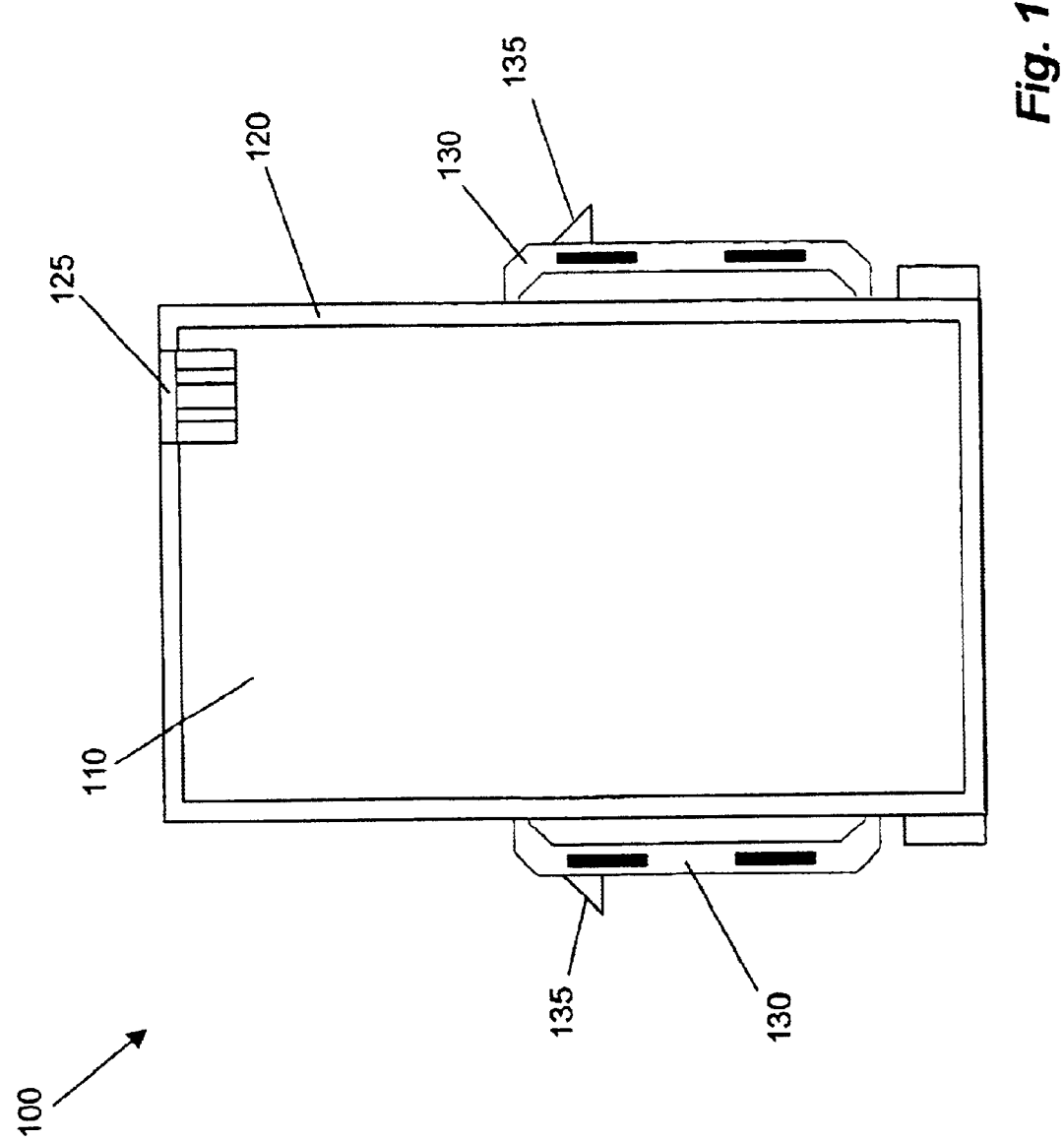
FIG. 1 is a top plan view of a battery pack showing integrated battery locking latches and integrated battery contacts of the present invention.

FIG. 1 is a top plan view of a battery pack showing integrated battery locking latches and integrated battery contacts of the present invention. The battery pack 100 includes a thin, light-weight battery 110 constructed in a generally rectangular shape, as shown in FIG. 1, for insertion into an internal compartment of an electronic device 105, such as a wireless telephone. Preferably, the battery pack has a length of about 90 millimeters. The width of the battery pack is about 40 millimeters, and the thickness of the battery pack is about 4.5 millimeters. The battery pack 100 includes a battery cell 110 suitable for providing power to an electronic device 105, as described above. Suitable batteries 110 include lithium ion batteries and lithium polymer batteries.

Battery contacts 125 are integrally constructed in the upper right-hand corner of the battery pack 100. The battery contacts 125 are constructed for providing electrical connectivity between the battery pack 100 and corresponding mating electrical contacts (not shown) located in the interior of a wireless device 105, such as a wireless telephone. As should be understood by those skilled those in the art, the battery contacts 125 may be located in different locations on the battery pack 100 as required by the differing design characteristics of wireless devices in which the battery pack 100 will be inserted.

The battery cell 110 is encased in a battery casing 120, which is preferably constructed from a light-weight polycarbonate material. The thickness of the battery casing is equal to the thickness of the battery cell 110. On each side of the battery pack 100, a battery locking latch 130 is integrated with the battery casing 120 for latching the battery pack 100 to the interior of an electronic device 105, such as a wireless telephone. The battery locking latches 130 may be constructed from the same material from which the battery casing 120 is constructed, and preferably, the battery casing 120 and battery locking latches 130 are constructed through a single construction process, such as injection molding, so that the strength of the connections between the battery locking latches 130 and the battery casing 120 are as strong as possible. Along the outer sides of the battery locking latches 130 are a pair of locking latch catches 135 for engaging battery latching detents 155 located on the inner housing of the wireless electronic device 105 in which the battery pack 100 is inserted.

The locking latches 130 include an elongate member having a first end and a second end. The first end is attached to a portion of the battery cell casing 120 and the second end is attached to the battery cell casing in spaced-apart relation to the first end such that a clearance is formed between an inner surface of the locking latch member and an outer surface of the battery cell casing between the connection points of the first and second ends of the locking latch member. The locking latches are deformable so that the locking latches may deform inward toward the outer surface of the casing between the connection points of the locking latches to the casing so that an outer surface of the locking latches and the locking latch catches may pass by an inner surface of the latching detents 155.

Figure 2:
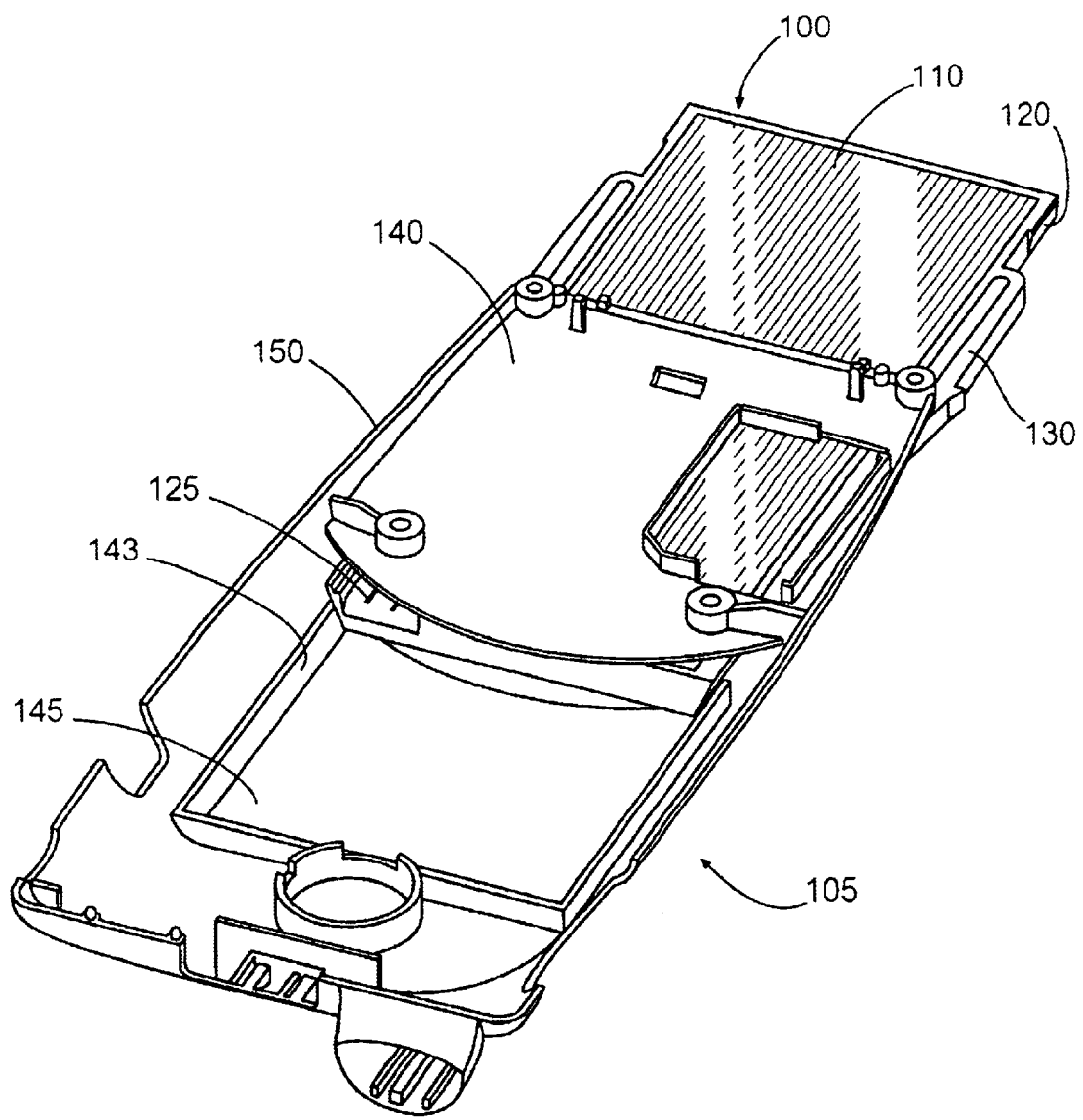
FIG. 2 is a perspective view of the front side of the bottom half of a wireless telephone with a battery pack of the present invention partially inserted.

FIG. 2 is a perspective view of the front side of the bottom half of a wireless telephone with a battery pack 100 of the present invention partially inserted. The battery pack 100 is relatively thin compared to the overall thickness of the electronic device 105, such as the wireless telephone illustrated in FIG. 2. The bottom half of a wireless telephone illustrated in FIG. 2 is illustrative of any electronic device in which the battery pack 100 of the present invention may be used. As shown in FIG. 2, the battery pack 100 is constructed such that the exterior dimensions of the battery pack 100 closely approximate the length and width of the electronic device 105 in which the battery pack 100 is inserted. Thus, the thickness of the battery pack 100 is minimized as shown in FIG. 2.

The bottom half of a wireless telephone case 150 illustrated in FIG. 2 includes a battery support structure 140 on which the battery pack 100 rests after insertion into the device case 150. Integrated support walls 143 are constructed interior of the bottom half of the casing 150 for accepting the battery pack 100 and for providing a snug and secure fit of the battery pack 100 after full insertion into the device casing 150, such as the wireless telephone case illustrated in FIG. 2. After full insertion of the battery pack 100 into the device casing 150, illustrated in FIG. 2, the battery contacts 125 of the battery pack 100 come to a stop at a position 145 interior of the electronic device casing 150 where electrical connectivity is obtained with corresponding mating electrical contacts (not shown) of a printed circuit board (not shown) of the electronic device 105 in which the battery pack 100 is inserted. As described above, if the electrical power contacts of the electronic device 105 are located in a different location interior of the electronic device casing 150, the battery contacts 125 may be positioned at a different place along the battery pack 100 according to the particular design characteristics of the electronic device 105 to which the battery pack 100 is mated.

Figure 3:
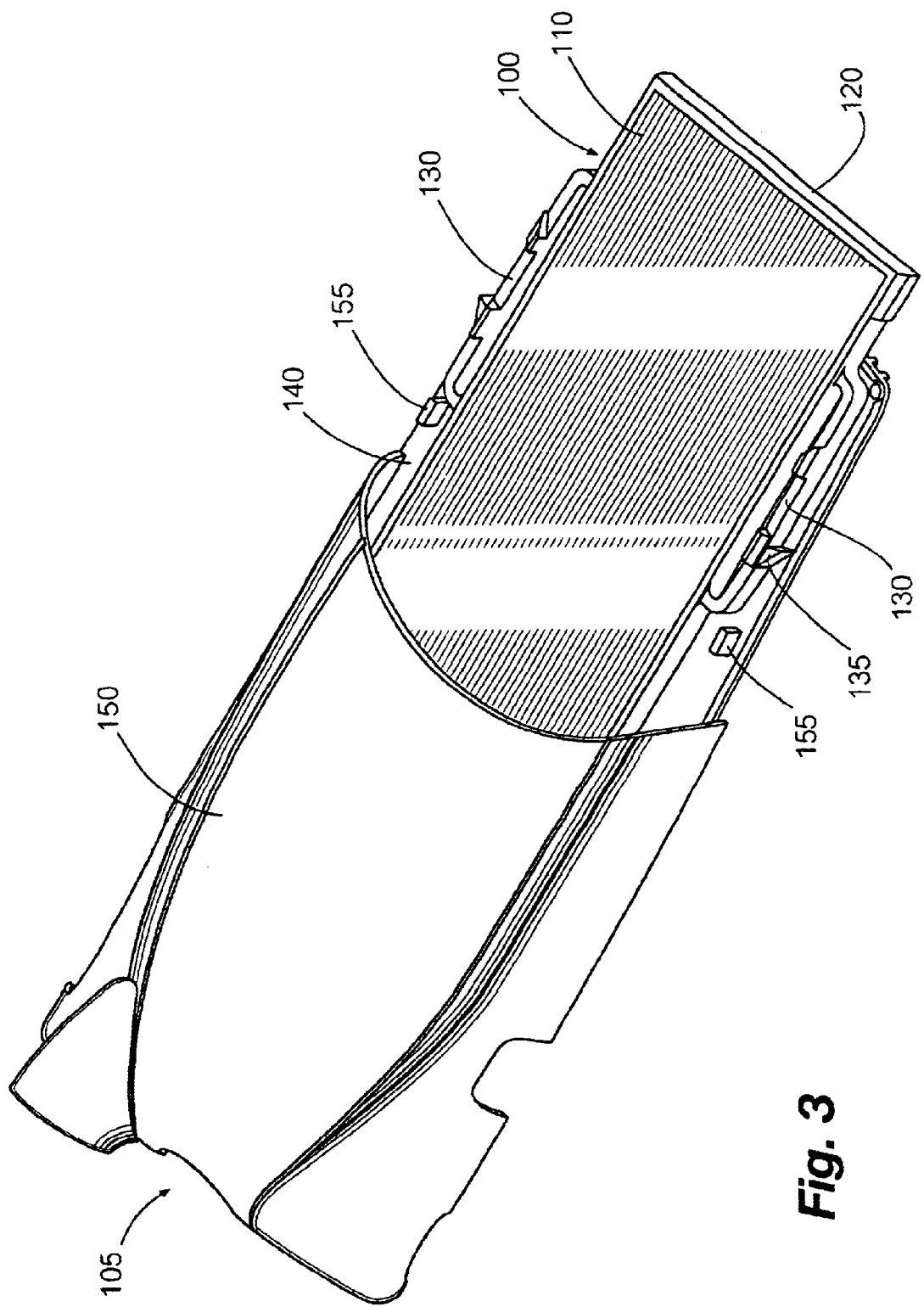
FIG. 3 is a perspective view of the back side of the bottom half of a wireless telephone with a battery pack of the present invention partially inserted.

FIG. 3 is a perspective view of the back side of the bottom half of an electronic device, such as a wireless telephone, with a battery pack of the present invention partially inserted. As shown in FIG. 3, a pair of battery latching detents 155 are integrally mounted on the upper surface of the battery support structure 140 of the electronic device casing 150. According to the present invention, the battery latching detents 155 provide latching engagement with the battery latching catches 135 positioned along the outer sides of the battery locking latches 130, shown in FIGS. 1 and 3. Preferably, the battery locking latches 130 and locking latch catches 135 are constructed with sufficient width relative to the interior width between the battery latching detents 155 such that during insertion of the battery pack 100 into the electronic device casing 150, the battery locking latches 130 are squeezed past the inner surface of the battery latching detents 155. Thus, the locking latch catches 135 slide past the battery latching detents 155 and catch on the forward edges of the battery latching detents 155 so that the battery pack 100 will be held tightly inside the electronic device casing 150.

Figure 4:
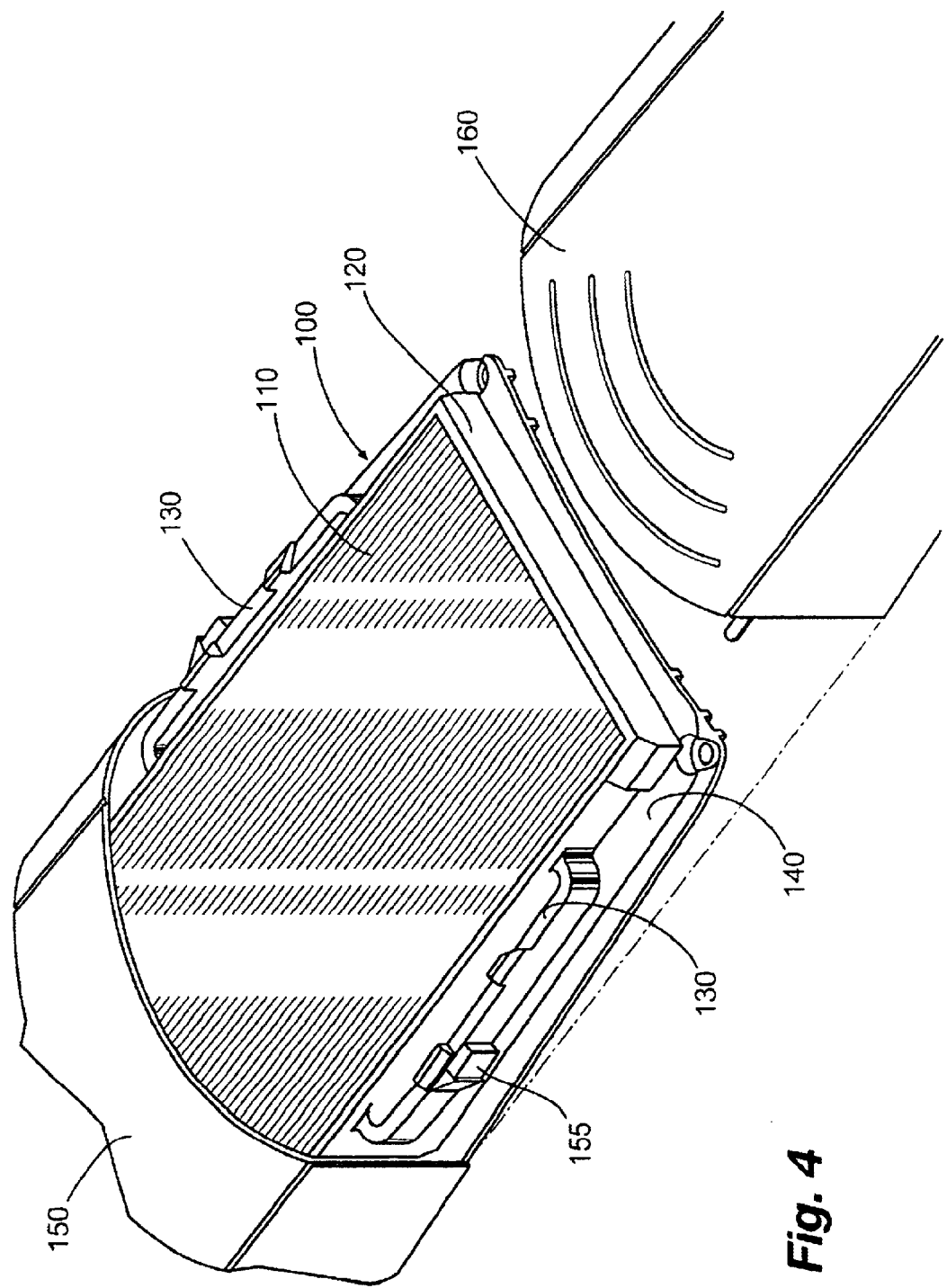
FIG. 4 is a partial perspective view of the back side of the bottom half of a wireless telephone with a battery pack of the present invention fully inserted and showing a partial view of a battery cover for attachment to the wireless telephone and for covering the battery pack.

FIG. 4 is a partial perspective view of the back side of the bottom half of a wireless telephone with a battery pack of the present invention fully inserted. The battery pack 100 is fully inserted into the electronic device casing 150. The battery locking latches 130 are oriented interior of the battery latching detents 155, and the locking latch catches 135 are stopped along the front edges of the battery latching detents 155 to secure the battery pack 100 inside the electronic device casing 150. A battery case cover 160 is illustrated in FIG. 4 and is oriented along the rear edge of the electronic device casing 150 and battery pack 100 for attachment to the device casing 150 for fully enclosing the battery pack 100 inside the device casing 150.

In operation, the battery pack 100 of the present invention is placed inside an electronic device casing 150, as illustrated in FIGS. 2 through 4, for providing power to the electronic device 105, such as a wireless telephone. To insert the battery pack 100 into the electronic device 105, the battery cover 160 is first removed from the back side of the electronic device 105 as illustrated in FIG. 4. The battery pack 100 is then placed on the upper surface of the battery support structure 140 and the forward edge of the battery pack 100 is inserted into the electronic device casing 150. As the forward edges of the battery locking latches 130 come into contact with the battery latching detents 155, the battery locking latches 130 are gently deformed inward with the fingers of the user to allow the battery locking latches 130 and locking latch catches 135 to gently slide past the interior sides of the battery latching detents 155. The battery locking latch catches 135 engage the forward edges of the battery latching detents 155, as illustrated in FIG. 4, and tightly secure the battery pack 100 inside the electronic device casing 150.

Having the battery pack 100 encased completely inside the casing 150 of the electronic device, as illustrated in FIG. 4, provides for very secure electrical contact between the battery contacts 125 and corresponding mating contacts of the electronic device 105 in which the battery pack 100 is inserted. The combination of the enclosure of the forward section of the battery pack 100 within the casing 150 and the secure latching of the latching catches 135 of the battery locking latches 130 with the battery latching detents 155 make it very difficult for a loss of electrical connectivity between the battery pack 100 and the electronic device 105 in the event the electronic device is dropped or vibrated. As shown in FIG. 4, the battery pack 100 is securely connected inside the casing 150 of the electronic device even when the battery cover 160 is removed. Therefore, if an electronic device 105 utilizing the battery pack 100 of the present invention is dropped or vibrated such that the battery cover 160 disengages and separates from the casing 150 of the electronic device 105, electrical connectivity between the battery contacts 125 and the corresponding mating contacts of the electronic device 105 is maintained.

The construction of the battery pack 100 allows for inserting the battery pack fully within the casing 150 of the electronic device, and the thinness of the battery pack 100 allows for the manufacture of thinner electronic devices that may be efficiently carried by a user in such places as a shirt pocket, slacks pocket, purse or briefcase. The simplicity of the construction of the locking latches 130 along with the latching detents 155 of the casing of the electronic device eliminates much of the materials costs and labor costs associated with attaching multi-part latching mechanisms to a battery pack and an electronic device during the manufacturing process, as is the case in typical prior art systems.

The present invention in its various aspects has been described in detail with regard to embodiments thereof. It should be understood that variations, modifications, and enhancements may be made to the disclosed articles and methods without departing from the spirit and scope of the present invention as defined in the appended claims.

We claim:

1. A battery pack for powering a hand-held portable electronic device, comprising:
   a battery cell having an upper surface, a lower surface, and an outer perimeter between the upper surface and the lower surface, the battery cell having a length, a width, and a thickness suitable for insertion into a hand-held portable device;
   a battery cell casing integrally connected to and surrounding the outer perimeter of the battery cell, whereby the casing has a thickness equal to the thickness of the battery cell; and
   a pair of locking latches for latching the battery pack to a hand-held portable electronic device, whereby a first locking latch of the pair of locking latches is defined along a first side of the outer perimeter, and a second locking latch of said pair of locking latches is defined along a second side of the outer perimeter opposite the first locking latch.

2. The battery pack of claim 1, further comprising a locking latch catch defined along an outer edge of each of the first and second locking latches and extending away from the battery cell.

3. The battery pack of claim 1, whereby the locking latches are attached to and integrated with the battery cell casing.

4. The battery pack of claim 1, wherein the first and second locking latches comprise an elongate member having a first end and a second end whereby the first end is attached to a portion of the battery cell casing and whereby the second end is attached to the battery cell casing in spaced-apart relation from the first end such that a clearance is formed between an inner surface of the locking latch member and an outer surface of the battery cell casing between a first connection point of the first end to the battery cell casing and a second connection point of the second end to the battery cell casing.

5. The battery pack of claim 4, whereby the locking latches are deformable such that the locking latches may be forced inward toward the outer surface of the casing between the connection point of the first end to the battery cell casing and the connection point of the second end so that the outer surface of the locking latches and the locking latch catches may pass by an inner surface of the detents.

6. The battery pack of claim 1, further comprising an electrical battery contact disposed along an outer surface of the battery cell for electrical contact with a mating contact of a portable electronic device.

7. The battery pack of claim 1, wherein the battery pack has a length of about 90 millimeters.

8. The battery pack of claim 1, wherein the battery pack has a width of about 40 millimeters.

9. The battery pack of claim 1, wherein a thickness of about 4.5 millimeters.

10. The battery pack of claim 1, wherein the battery cell casing is constructed from a polycarbonate material.

11. A wireless telephone comprising the battery pack of claim 1.

12. A hand-held computer comprising the battery pack of claim 1.

13. A personal digital assistant comprising the battery pack of claim 1.

14. The battery pack of claim 1, wherein the battery cell includes a lithium ion battery cell.

15. The battery pack of claim 1, wherein the battery cell includes a lithium polymer battery cell.

16. A portable electronic device and comprising:
   a battery compartment for receiving a battery pack for powering the electronic device, the battery compartment including a battery support structure for supporting a battery pack after the battery pack is inserted into the electronic device, wherein the battery support structure includes spaced-apart first and second latching detents for securing the battery pack to the electronic device; and the a battery pack including:
- a battery cell, the battery cell having an upper surface a lower surface, and an outer perimeter between the upper surface and the lower surface, the battery cell having a length, a width, and a thickness suitable for insertion into the portable electronic device;
- a battery cell casing integrally connected to and surrounding the outer perimeter of the battery cell, whereby the casing has a thickness equal to the thickness of the battery cell; and
- a pair of locking latches for engaging the latching detents for attaching the battery pack to the electronic device, whereby a first locking latch of the pair of locking latches is defined along a first side of the outer perimeter, and a second locking latch of said pair of locking latches is defined along a second side of the outer perimeter opposite the first locking latch.

17. The portable electronic device of claim 16, further comprising a locking latch catch defined along an outer edge of each of the first and second locking latches for engaging first and second latching detents of the battery support structure of the electronic device for securing the battery pack within the electronic device.

18. The portable electronic device of claim 17, whereby the locking latches are deformable such that the locking latches may be forced inward toward an outer surface of the casing.

19. The portable electronic device of claim 16, wherein the battery cell includes a lithium ion battery cell.

20. The portable electronic device of claim 16, wherein the battery cell includes a lithium polymer battery cell.

21. The battery pack of claim 16, whereby the locking latches are attached to and integrated with the battery cell casing.

22. The battery pack of claim 16, wherein the first and second locking latches comprise an elongate member having a first end and a second end whereby the first end is attached to a portion of the battery cell casing and whereby the second end is attached to the battery cell casing in spaced-apart relation from the first end such that a clearance is formed between an inner surface of the locking latch member and an outer surface of the battery cell casing between a first connection point of the first end to the battery cell casing and a second connection point of the second end to the battery cell casing.

23. The portable electronic device of claim 16 further comprising a battery cover that covers the battery pack and battery support structure.

24. A battery pack for powering a hand-held portable electronic device, comprising:
- a battery cell having an upper surface, a lower surface and an outer perimeter between the upper surface and the lower surface, the battery cell having a length, a width, and a thickness suitable for insertion into a hand-held portable device;
- a battery cell casing integrally connected to and surrounding the outer perimeter of the battery cell, whereby the casing has a thickness equal to the thickness of the battery cell; and
- a pair of locking latches for latching the battery pack to a hand-held portable electronic device, whereby a first locking latch of the pair of locking latches is defined along a first side of the outer perimeter, and a second locking latch of said pair of locking latches is defined along a second side of the outer perimeter opposite the first locking latch, and wherein the first and second locking latches comprise an elongate member having a first end and a second end whereby the first end is attached to a portion of the battery cell casing and whereby the second end is attached to the battery cell casing in spaced-apart relation from the first end such that a clearance is formed between an inner surface of the locking latch member and an outer surface of the battery cell casing between a first connection point of the first end to the battery cell casing and a second connection point of the second end to the battery cell casing.

* * * * *